Sept. 2, 1924.  
F. J. RUNSER  
PLUG  
Original Filed July 29, 1922  
1,507,091
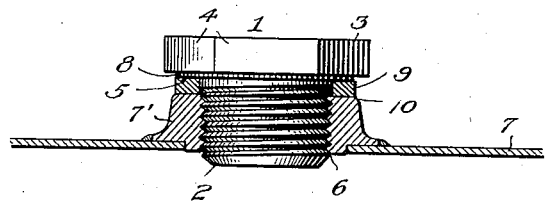
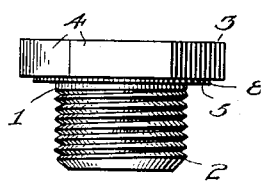 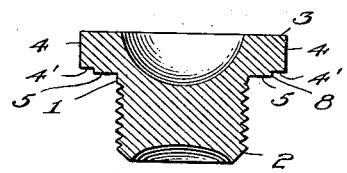
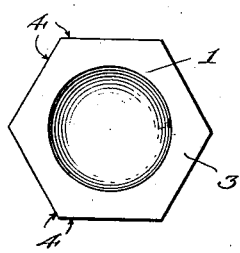 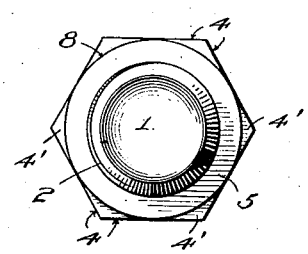
Inventor  
Fredrick J. Runser  
By Geo. A. Pitts  
Attorney Patented Sept. 2, 1924.

1,507,091

UNITED STATES PATENT OFFICE.

FREDRICK J. RUNSER, OF CLEVELAND, OHIO, ASSIGNOR TO THE BYRNE MANUFACTURING COMPANY, OF CLEVELAND, OHIO, A CORPORATION OF OHIO.

PLUG.

Original application filed July 29, 1922, Serial No. 578,394. Divided and this application filed May 9, 1923. Serial No. 637,624.

*To all whom it may concern:*

Be it known that I, FREDRICK J. RUNSER, a citizen of the United States, residing at Cleveland, in the county of Cuyahoga and State of Ohio, have invented certain new and useful Improvements in Plugs, of which the following is a specification.

This invention relates to a plug for openings in containers, for example: barrels and the like, for sealing the same.

One object of the invention is to provide an improved plug shaped to form a gasket seat spaced from the plug head, so that the plug may be secured into position and against the gasket without injury to it or affecting its sealing action.

Other objects of the invention will be apparent to those skilled in the art to which my invention relates from the following description taken in connection with the accompanying drawing, whereas:

Fig. 1 is a fragmentary sectional view of a barrel showing a plug embodying my invention positioned in the barrel opening to seal it.

Fig. 2 is an elevation of the plug.

Fig. 3 is a longitudinal sectional view of the plug.

Fig. 4 is a top plan view.

Fig. 5 is a bottom plan view.

In the drawings, 1 indicates the body portion of the plug having a shank 2 and a flanged portion 3 forming the head of the plug, the side wall of the head having a plurality of flattened faces 4, forming angles 4' which project beyond a gasket seat 5 to be later referred to, and to adapt the head to a suitable tool to permit the application of the plug to an opening 6 in a wall, for example, the wall of a container indicated at 7 in the drawings, or a suitable ring 7' secured therein. The shank 2 of the plug is preferably provided with screw threads which engage screw threads on the wall of the opening 6; altho other forms of securing means may be utilized.

8 indicates an annular shoulder extending around the base of the shank 2 to form the gasket seat 5 spaced from the inner wall of the flange or head 3, which seat engages a gasket 9 to compress it against a seat 10 provided around the container opening 6. The shoulder 8 provides (1) sufficient metal so that in machining the plug, it may be put into a lathe and rapidly cut by a suitable cutting tool without undue strain or danger of the tool engaging varying amounts of metal constituting the angles 4' and cause chattering and resulting damage; and (2) a gasket seat spaced from the inner faces formed by the angles 4', so that in the event the periphery of the gasket bends or flexes laterally due to the tightening of the plug in its opening 6, such laterally bent or flexed portions will not engage the angles 4' and permit the latter to rotate the gasket 9 with the plug and thereby damage the gasket and prevent its properly sealing the opening.

This application is a division of my application Serial No. 578,394, filed July 29, 1922.

To those skilled in the art to which my invention relates, many widely differing embodiments and applications of the invention will suggest themselves without departing from the spirit and scope thereof. My disclosures herein are purely illustrative and are not intended to be in any sense limiting.

What I claim is:

1. A plug for an opening in a container comprising a screw-threaded shank and an integral polygonal head having a gasket seat around said shank, the face of said seat being spaced from the under face of said head and the side faces of said head being substantially tangential to the circumference of said seat.

2. A plug for an opening in a container comprising a shank having securing means for engagement with co-acting securing means in the wall of the container opening, a head for the shank having angularly arranged sides. an annular shoulder extending around the shank upon the under face of said head and forming a gasket seat spaced therefrom to prevent engagement of the angles of the head with the gasket while the plug is being rotated or tightened into position in the container opening, the side faces of said head being substantially tangential to the circumference of said shoulder.

In testimony whereof, I have hereunto subscribed my name.

FREDRICK J. RUNSER.